US006745861B2

(12) United States Patent
Hare

(10) Patent No.: US 6,745,861 B2
(45) Date of Patent: Jun. 8, 2004

(54) AIRBAG NEUTRALIZING CRASH RESCUE SYSTEM

(76) Inventor: Tommie D. Hare, 184 County Rd. 376, Wynne, AR (US) 72396-9525

( * ) Notice: Subject to any disclaimer, the term of this patent is extended or adjusted under 35 U.S.C. 154(b) by 21 days.

(21) Appl. No.: 10/138,445

(22) Filed: May 3, 2002

(65) Prior Publication Data

US 2003/0205425 A1 Nov. 6, 2003

(51) Int. Cl.⁷ .................................................. B60D 1/28
(52) U.S. Cl. ..................................................... 180/271
(58) Field of Search .......................... 180/271; 280/749, 280/727

(56) References Cited

U.S. PATENT DOCUMENTS

| | | | | |
|---|---|---|---|---|
| 379,870 A | * | 3/1888 | Hohorst | 280/79.11 |
| 3,831,975 A | * | 8/1974 | Mednikow | 280/749 |
| 4,622,724 A | * | 11/1986 | Dupre | 24/130 |
| 5,121,957 A | * | 6/1992 | O'Shea | 296/1.04 |
| 5,277,440 A | * | 1/1994 | Jackson, Jr. | 280/727 |
| 5,458,447 A | * | 10/1995 | Clason | 410/100 |
| 5,547,219 A | * | 8/1996 | Ha | 280/749 |
| 5,879,048 A | * | 3/1999 | Tower | 296/152 |
| 6,152,664 A | * | 11/2000 | Dew et al. | 410/100 |
| 6,203,055 B1 | * | 3/2001 | Mouws | 280/727 |

* cited by examiner

Primary Examiner—Michael J. Carone
Assistant Examiner—M. Thomson
(74) Attorney, Agent, or Firm—Stephen D. Carver

(57) ABSTRACT

A rescue system protects against air bags as deformed vehicle parts are deflected to free trapped occupants at a crash site. A large rectangular net internally conformed over structural parts of the wreck assumes multiple configurations. When internally deployed within the wreck, it completely covers structural parts to be bent, and constrains air bags to prevent contact with trapped occupants. A smaller net blocks the steering column air bag. A plurality of outwardly extending draw straps with terminal buckles can be externally coupled together, or coupled to conventional power rescue devices. Multiple draw hook assemblies extend between the net, and exposed structures of the wreck to be grasped. The draw hook assembly comprises a rigid clasp with an internal channel for non-destructive attachment to the net. An elongated draw hook extending from the clasp terminates in a cradle supporting auxiliary hooks.

6 Claims, 20 Drawing Sheets

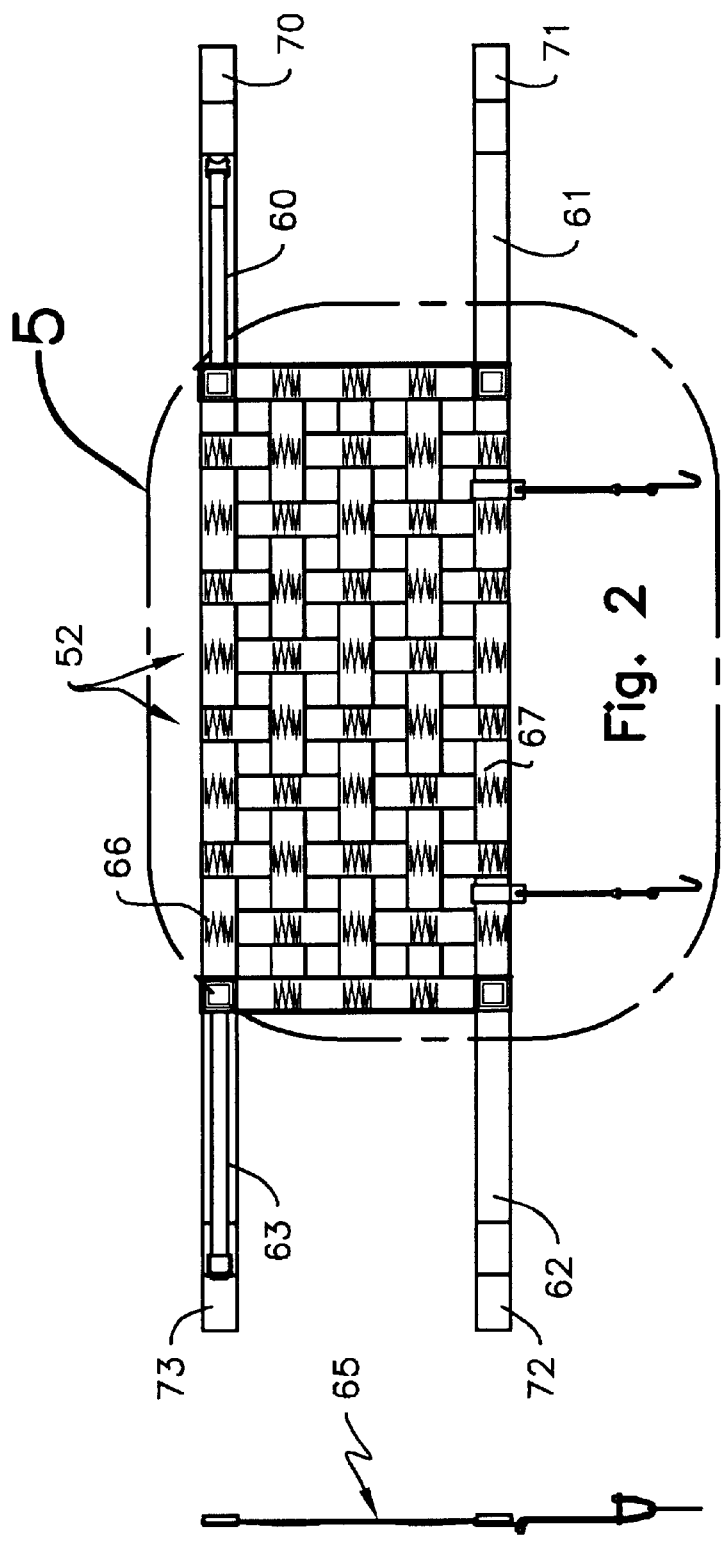
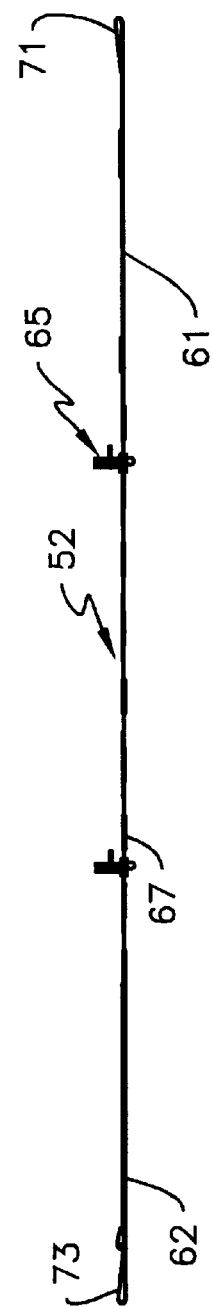
Fig. 2
Fig. 3
Fig. 4

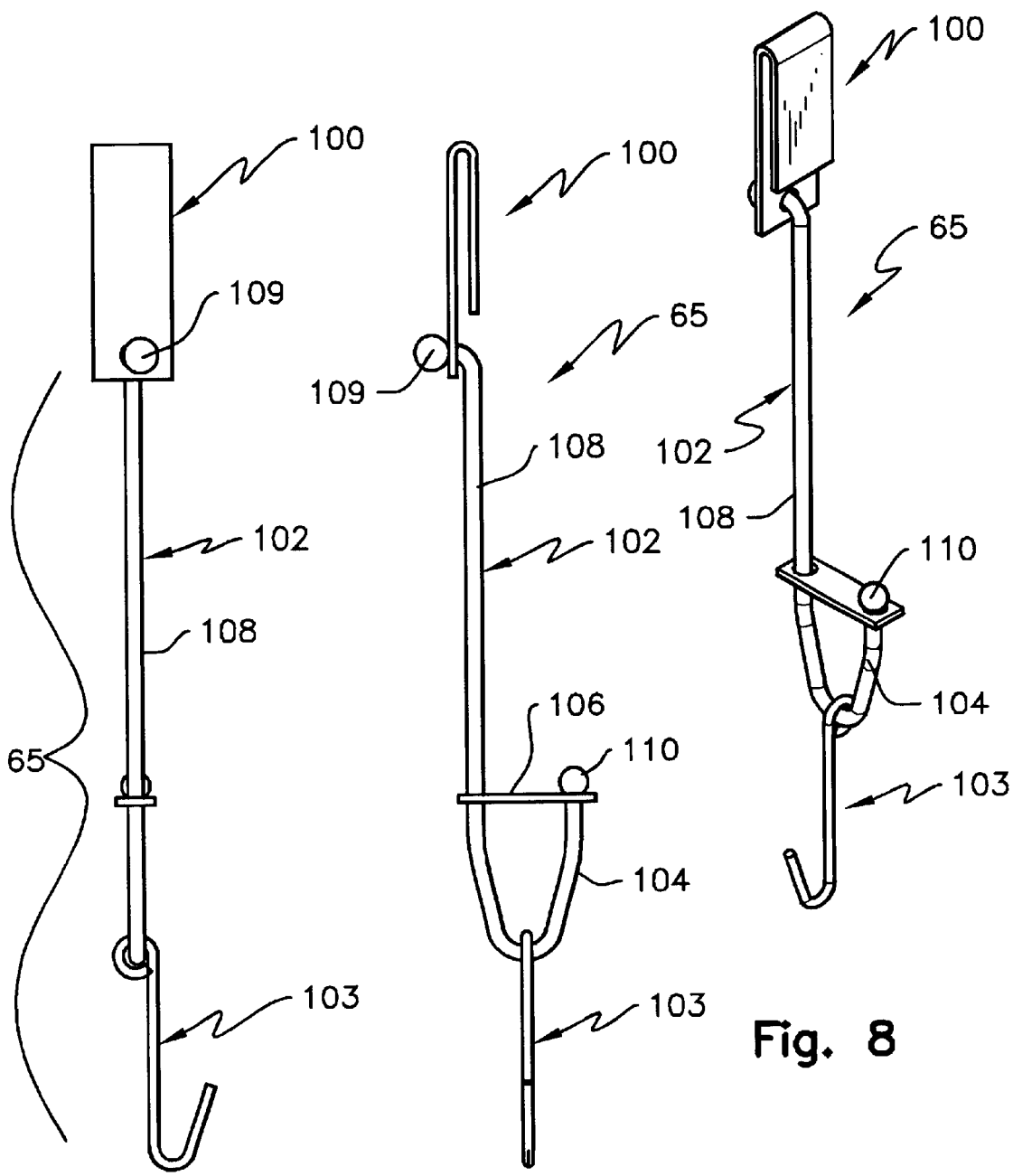

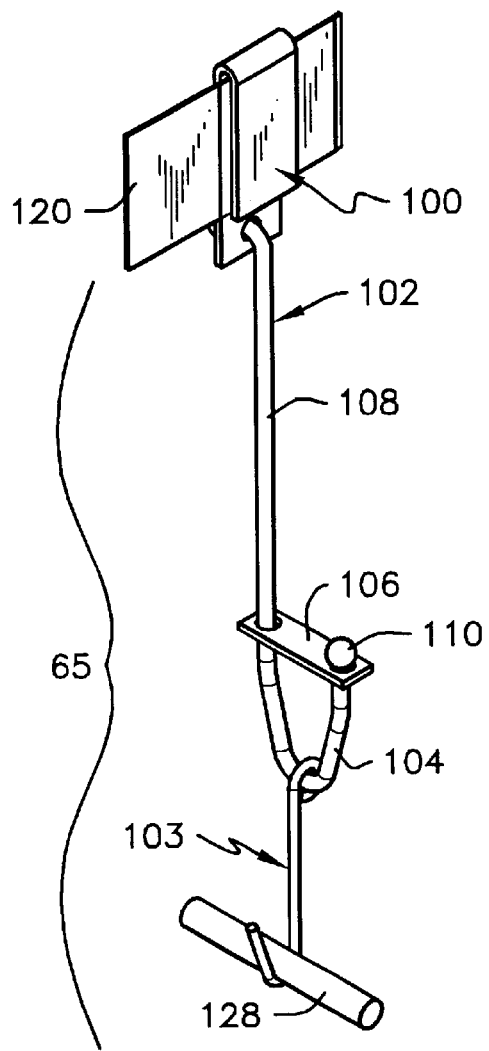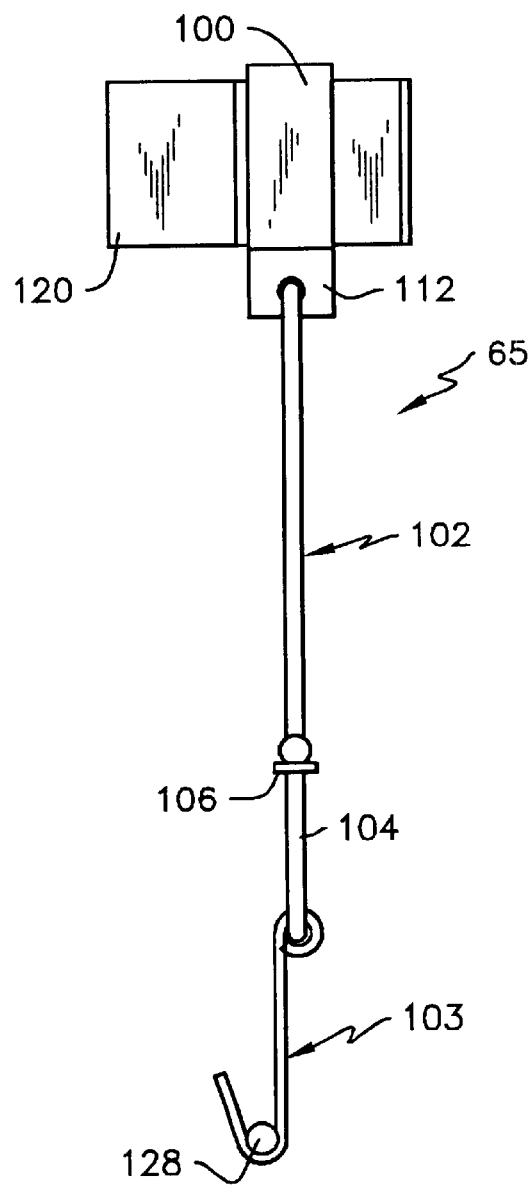
Fig. 9
Fig. 10

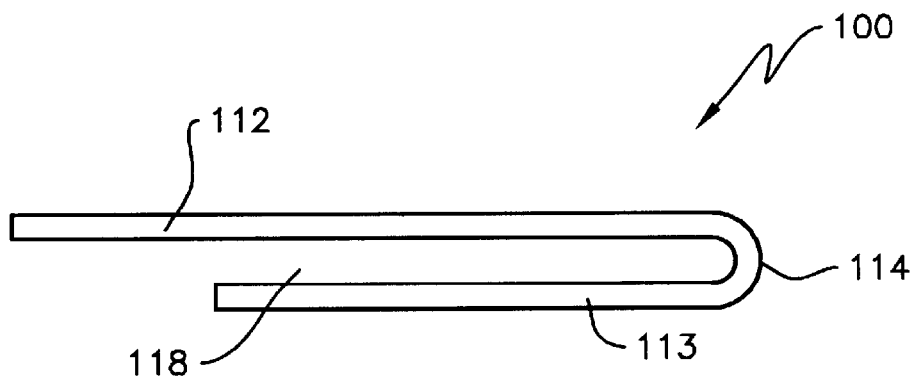
Fig. 12
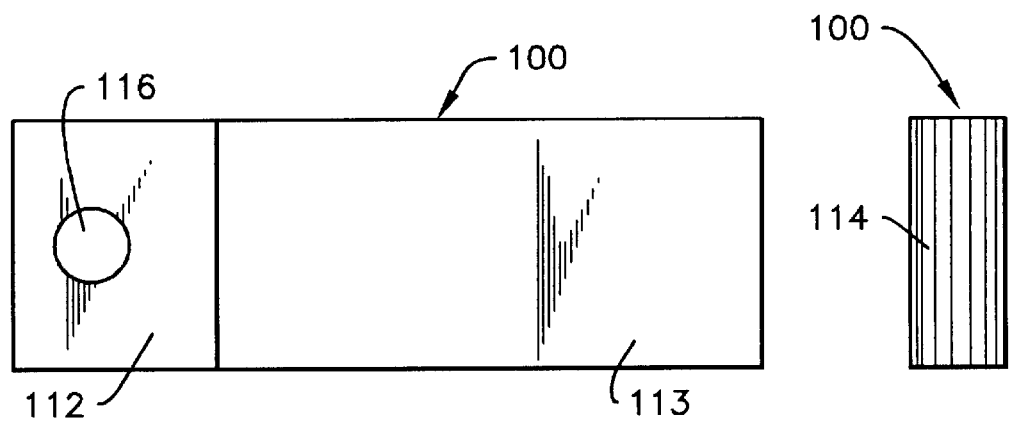
Fig. 11
Fig. 13

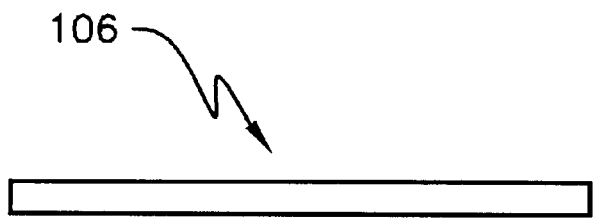
Fig. 19
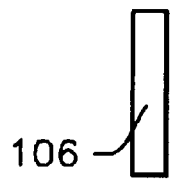
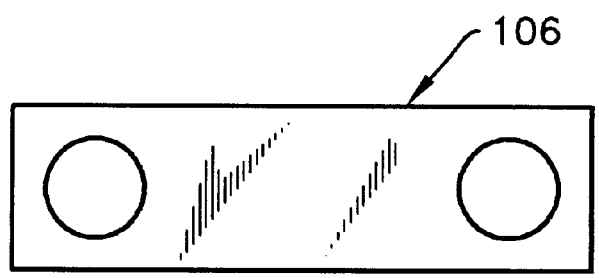
Fig. 20        Fig. 18
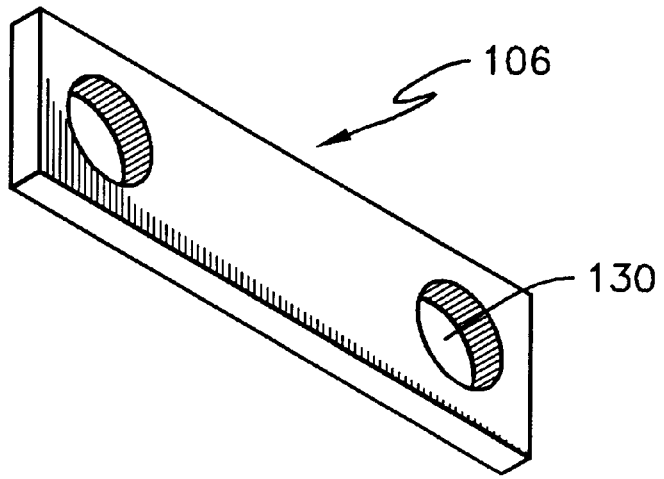
Fig. 21

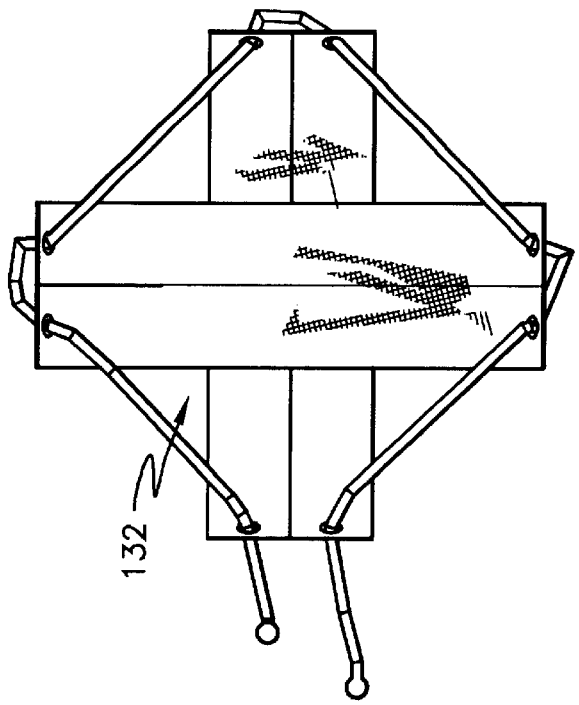
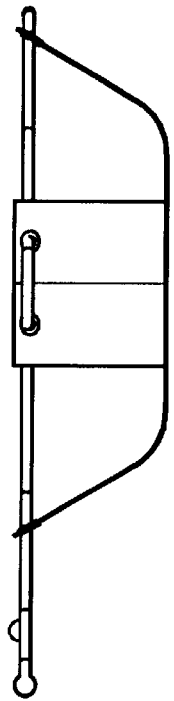
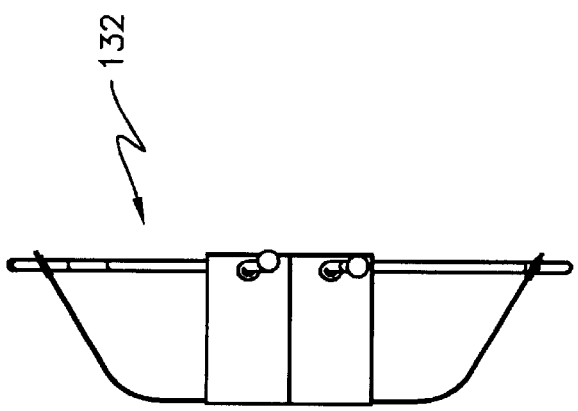
Fig. 22
Fig. 23
Fig. 24

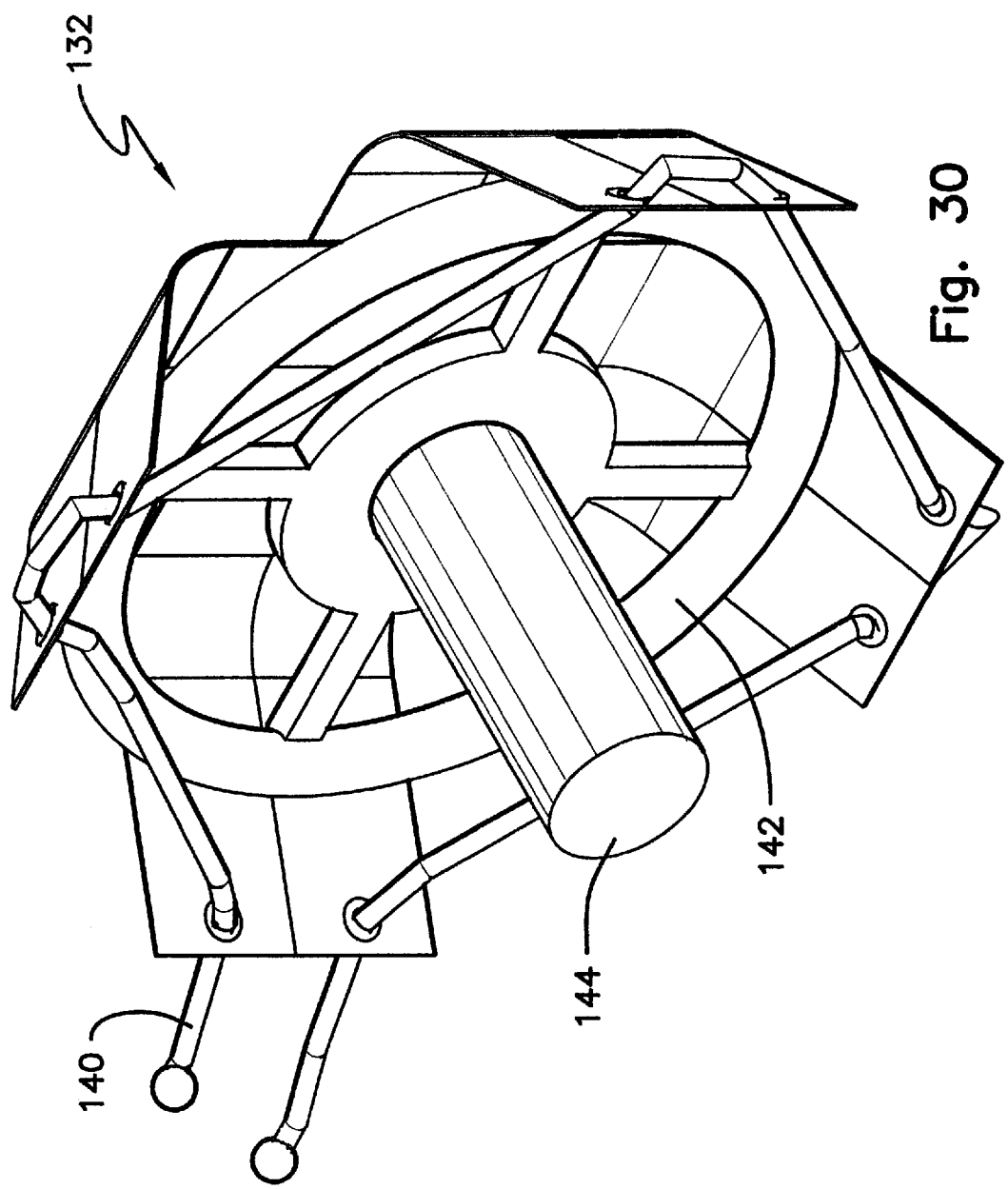

AIRBAG NEUTRALIZING CRASH RESCUE SYSTEM

BACKGROUND OF THE INVENTION

I. Field of the Invention

The present invention relates generally to emergency recovery tools for rescuing trapped, human passengers after vehicular accidents. More particularly, the present invention relates to an automotive rescue tool system primarily for protecting against air bag detonation when deforming and bending dashboards (and other vehicle parts) during the emergency rescue of trapped accident victims.

II. Description of the Prior Art

It has long been recognized by those skilled in the art that crashed vehicles must be manipulated with the utmost in caution to free trapped passengers without further injuring them. As a result of high speed accidents and collisions, one or more of the vehicle occupants may be trapped within the wreckage. The trapped passengers often may be severely injured, so they must be removed with an abundance of caution. The rescue procedure must proceed slowly and deliberately to prevent injury or aggravation of accident-caused injuries. While the rescue activities must proceed safely, speed is highly desirable, since potentially life-saving medical attention for the injured may be required. The trapped or disabled occupants, and those emergency response personnel involved in the rescue activities, also face the omnipresent danger of fire or explosion, underlining the value of speed.

At the same time, to minimize secondary injuries caused after the accident, speed must be attenuated by prudence, to avoid for example, exploding those vehicle air bags which have not already detonated as a result of the accident. For safety reasons, modern vehicles are required to be equipped with a plurality of air bags that are supposed to protect vehicle occupants during collisions. In response to suitable predefined forces, these gas-operated "bags" forcibly "detonate," expanding rapidly to provide a soft, impact absorbing cushion. Within a short period after firing, the air bag is supposed to deflate automatically. However, it is well recognized that typical collisions or damaging impacts do not always detonate or "fire" all of the vehicle's air bags. Even after a serious accident or collision involving a modern vehicle, some of the air bags fail to fire. When the vehicle is thereafter subjected to bending, prying, pounding and other structural stresses applied to free the occupants, one or more air bags may suddenly and unpredictably detonate. A passenger trapped proximate an unexploded air bag in a wreck is seriously at risk. When a trapped and possibly-injured passenger is uncomfortably and haphazardly pinned behind the smashed dashboard of a wreck, for example, blows to the person caused by the inadvertent activation of an air bag can severely traumatize and further injure him.

In view of the almost universal incorporation of multiple air bags in modern vehicles, improved rescue hardware that prevents the detonation of un-spent airbags at the crash scene is desirable. Further, such a solution must be able to adapt itself into a variety of sizes and geometrical configurations to amicably handle the wide variety of vehicle shapes and sizes in use today.

One well known rescue tool is disclosed in U.S. Pat. No. 3,819,153 This reference shows a basic, forcible mechanical device often referred to as the "Jaws of Life." Such devices provide a means of forcibly cutting and deflecting bent and deformed vehicle parts to free trapped victims and provide an escape route. The device comprises a pair of rigid, cooperating pivoted jaws which can be activated hydraulically. When these jaws contact deformed metal parts, they are quickly deformed, cut and bent.

U.S. Pat. No. 5,425,260 issued Jun. 20, 1995 provides an accident rescue tool characterized by strong and relatively inflexible steel components. The device comprises a supporting base to which a rigid lifting arm is pivoted the base. Chains interconnected with the lifting arm are connected at various ends to a vehicle component that is to be deflected.

U.S. Pat. No. 4,732,029 disclosed an accident rescue tool in the form of a roller, comprising telescopic arms, a roller on a free end of one arm and a fixed roller on the free end of the other arm. The rigid and relatively heavy device is operated by chains associated with prior rescue tools, with the chains being supported by and coactive with the rollers.

None of the patents mentioned above or others known to me present a deformable and highly adaptable means for bending and deflecting crashed vehicles, which is specifically designed to provide protection against inadvertent safety air bag detonation.

SUMMARY OF THE INVENTION

This invention provides a flexible and highly maneuverable net system that can be applied to portions of a deformed, crashed vehicle to deflect critical parts to free trapped passengers. The system guards against air bags that may explosively detonated during rescue. The system can also be used to deflect certain bent or deformed parts, while at the same time constraining air bags.

Thus possible additional injuries or trauma caused by the sudden activation of previously-unfired air bags is avoided during rescue. This fact speeds up the entire rescue operation, while concurrently making it safer for both the trapped or injured vehicle occupants and the rescue team.

My rescue tool system is adapted to be installed at accident scenes to thereafter deflect deformed vehicle parts such as the dashboard, steering columns, and the like. A large, flexible preferably rectangular net is inherently configurable to the irregular, structural contour of the deformed vehicle, so that forces are distributed evenly. The net can be foldably transformed between a variety of irregular and random configurations that result after a crash, so that it can properly "cover" various structural parts of crashed and deformed vehicles. The net thus firmly grasps target structures prior to being tensioned or pressured by external power-driven pulling or lifting apparatus.

The preferred net has a plurality of diametrically opposed corners from which outwardly extending draw straps extend. The net comprises interleaved, flexible lengths of reinforced polyester, which are assembled in a mutually orthogonal, woven pattern. The draw straps terminate in outer, buckles facilitating interconnection of the net draw ends externally of the crashed vehicle. The buckles also enable interconnection with conventional crash scene rescue tools. Optionally a smaller secondary net is deployed over the steering wheel to separately block the steering column air bag. It's straps enable it to be structurally interconnected with the system.

The rescue system additionally comprises one or more draw hook assemblies adapted to extend between various portions of the net, and various exposed structures of the crashed vehicle. These draw bar assemblies may also be interconnected with the powered lifting apparatus etc. The draw hook assemblies mechanically link to the net so that it may be forcibly pulled by conventional, powered equipment in typical use by rescue personnel. Each draw hook assembly comprises a rigid clasp that receives and captivates a portion of the net when it is attached. The unique clasp comprises a unique, thin rectangular channel disposed between its two rigid, planar and parallel walls that non-destructively mates with a selected net portion. The clasp flexibly connects to an elongated, rigid draw hook, that terminates in a cradle supporting one or more smaller, auxiliary hooks. The draw hook cradle is protectively covered sealed by a rigid closure plate that prevents dislodgment of the auxiliary hooks, compensating for twisting and turning movements.

In operation, the smaller secondary net may be installed over the steering wheel or steering column to block the steering column air bag. The larger net may be flexibly, custom fitted within the vehicle, primarily proximate the dashboard to provide controllable gripping force which is distributed over the surface of the constrained structure. The draw strap ends of the large net are extended through the vehicle windshield area, and routed to the front of the vehicle, at which point they may be mechanically connected to various power lifting or pressure tools common to typical rescue teams. The net is further interconnected with the vehicle structure to be bent by interposing one or more of the draw hook assemblies at one or more desired strategic locations. The unique clasp channel insures non-destructive captivation of the net webbing, and the draw hooks evenly distribute pulling forces. As the net covers a large surface area, a plurality of air bags are covered.

Thus a basic object is to provide a rescue tool that guards against air bags when servicing a wrecked vehicle.

A similar object is to provide an air-bag constraining system that can also deform and deflect bent, crashed vehicle structures without detonating the vehicle airbags.

A related object is to protect the occupants within a crashed or deformed vehicle as they are rescued.

A basic object is to provide a flexible and adaptable rescue tool that can be readily connected to various deformed and randomly bent and smashed vehicle portions, to readily facilitate deflection of the steering column and other deformed parts.

A basic object is to provide a rescue tool of the character described that can be readily adapted to a variety of vehicle sizes and configurations.

Another basic object is to provide a rescue tool of the character described that permits removal and rescue of a trapped passengers through the windshield opening, or through other post-crash orifices that are available.

A related object is to simplify rescue operations.

More particularly, it is an object of my invention to prevent detonating air bags within the wrecked vehicle from contacting rapped passengers or rescue personnel.

A still further object of the my invention is to minimize the time required to safely rescue trapped occupants at accident scenes.

Another objective of my invention is to readily manipulate the deformed steering column of vehicle wrecks without injury from detonating air bags.

A still further object of my invention is to provide a tool of the character described which may be used with a wide variety of vehicles including small compact passenger cars, compacts, full sized cars, intermediates, and various trucks.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 2 is a top plan view of the rescue system of FIG. 1;

FIG. 3 is a left end elevational view, taken form a position to the left of FIG. 2;

FIG. 4 is a front elevational; view, taken from a position generally beneath FIG. 2 and looking upwardly;

FIG. 6 is a front elevational view of a preferred draw hook assembly;

FIG. 7 is a side elevational view of a preferred draw hook assembly;

FIG. 8 is an isometric view of the draw hook assembly seen in FIGS. 6 and 7;

FIG. 9 is an enlarged and partially fragmentary and diagrammatic isometric view of the preferred draw hook assembly of FIGS. 6–8, derived from circled region 9 in FIG. 1, and with the device shown in actual use;

FIG. 10 is a partially fragmentary, elevational view of the preferred draw hook assembly of FIG. 9;

FIG. 11 is an enlarged, top plan view of the preferred net-grabbing clasp;

FIG. 12 is an elevational view of the clasp of FIG. 11;

FIG. 13 is an end view of the clasp of FIG. 11;

FIG. 18 is an enlarged, top plan view of the preferred draw hook closure plate;

FIG. 19 is a side elevational view of the draw hook closure plate, taken from a position generally above FIG. 18 and looking downwardly;

FIG. 20 is an end elevational view of the draw hook closure plate, taken from a position generally to the left of FIG. 18 and looking towards the right;

FIG. 21 is an isometric view of the draw hook closure plate;

FIG. 22 is a top plan view of the auxiliary steering wheel net;

FIG. 23 is a side elevational view of the steering wheel net, taken from a position generally beneath FIG. 22 and looking upwardly;

FIG. 24 is an end elevational view of the steering wheel net, taken from a position generally to the left of FIG. 22 and looking towards the right;

FIG. 30 is a diagrammatic isometric view derived from FIGS. 28 and 29, with portions thereof broken away or shown in section for clarity;

DETAILED DESCRIPTION

Figure 31:
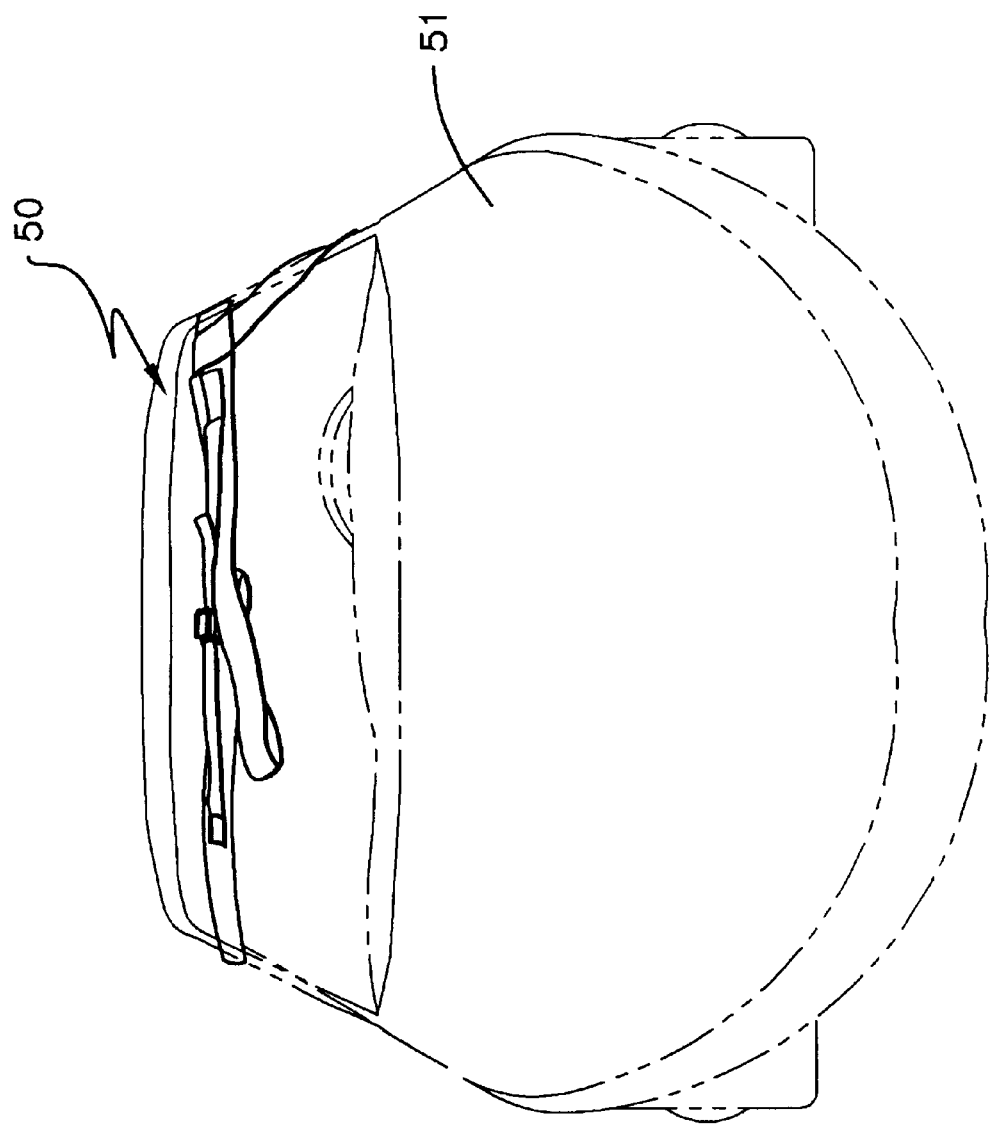
FIG. 31 is a diagrammatic environmental view showing the preferred net assembly installed, with the safety buckle engaged, with portions thereof broken away or shown in phantom lines for clarity.

Turning now to the appended drawings, and referring initially to FIGS. 1–5 thereof, my rescue tool is in the form of a flexible net system equipped with diverse accessories, that have been collectively designated by the reference numeral 50. The flexible rescue system 50 comprises a primary net 52 that can be readily wrapped around exposed structural portions of a deformed vehicle 51 (FIG. 31) at a crash site.

Figure 1:
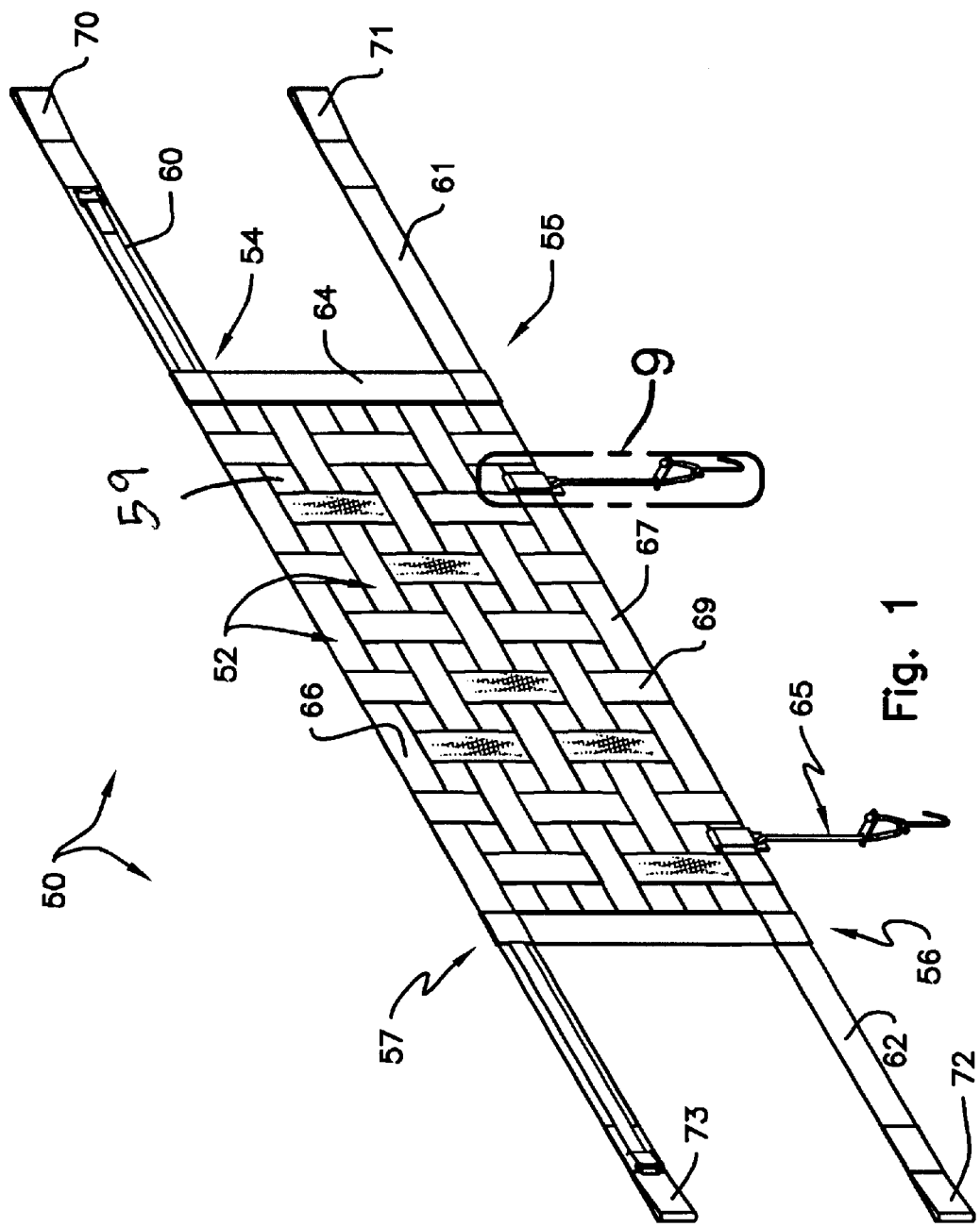
FIG. 1 is a top frontal isometric view of my preferred crash rescue system, showing it disposed within one possible configuration.
Figure 5:
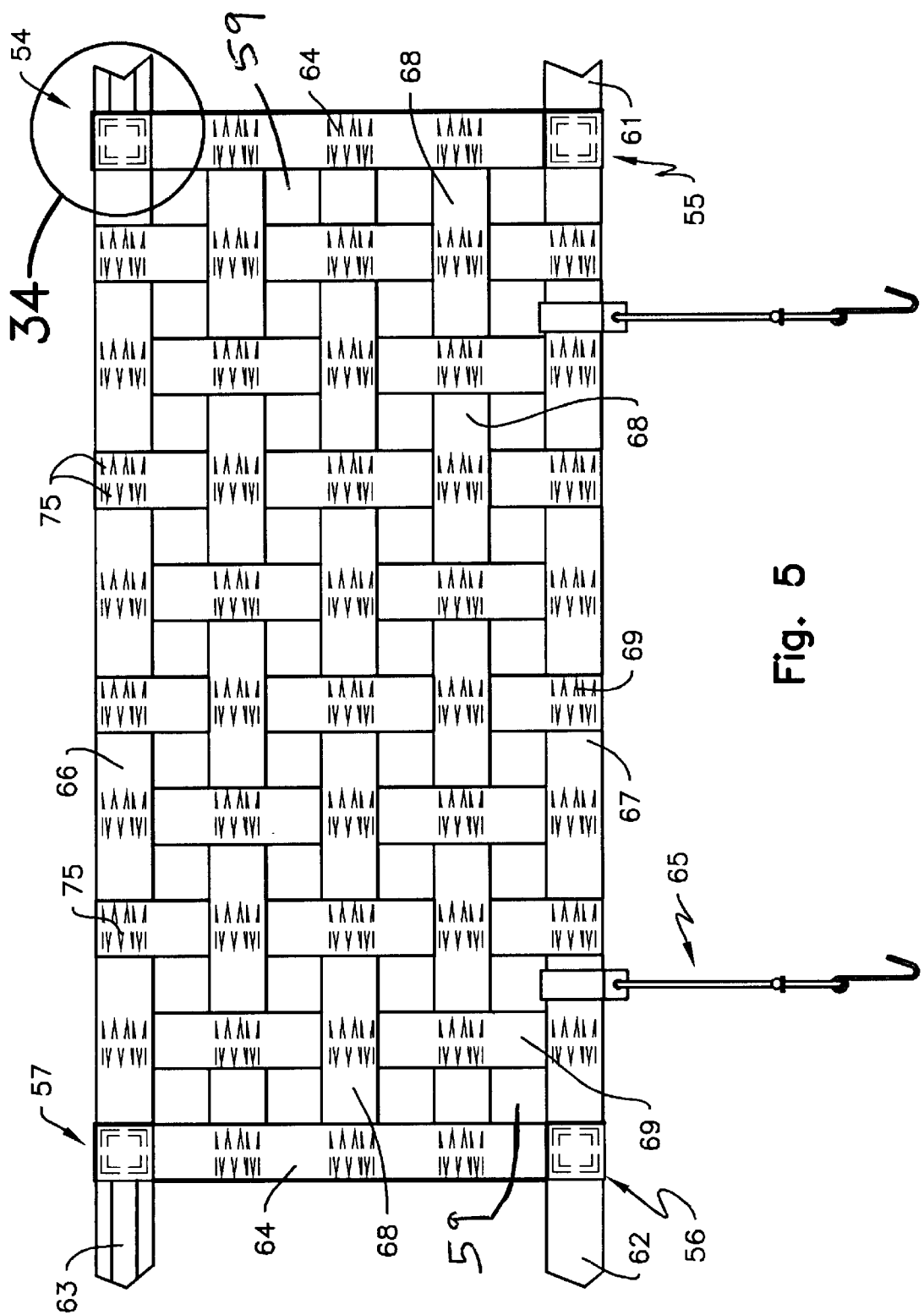
FIG. 5 is an enlarged, fragmentary plan view of region 5 circled in FIG. 2, particularly showing the preferred net.
Figure 14:
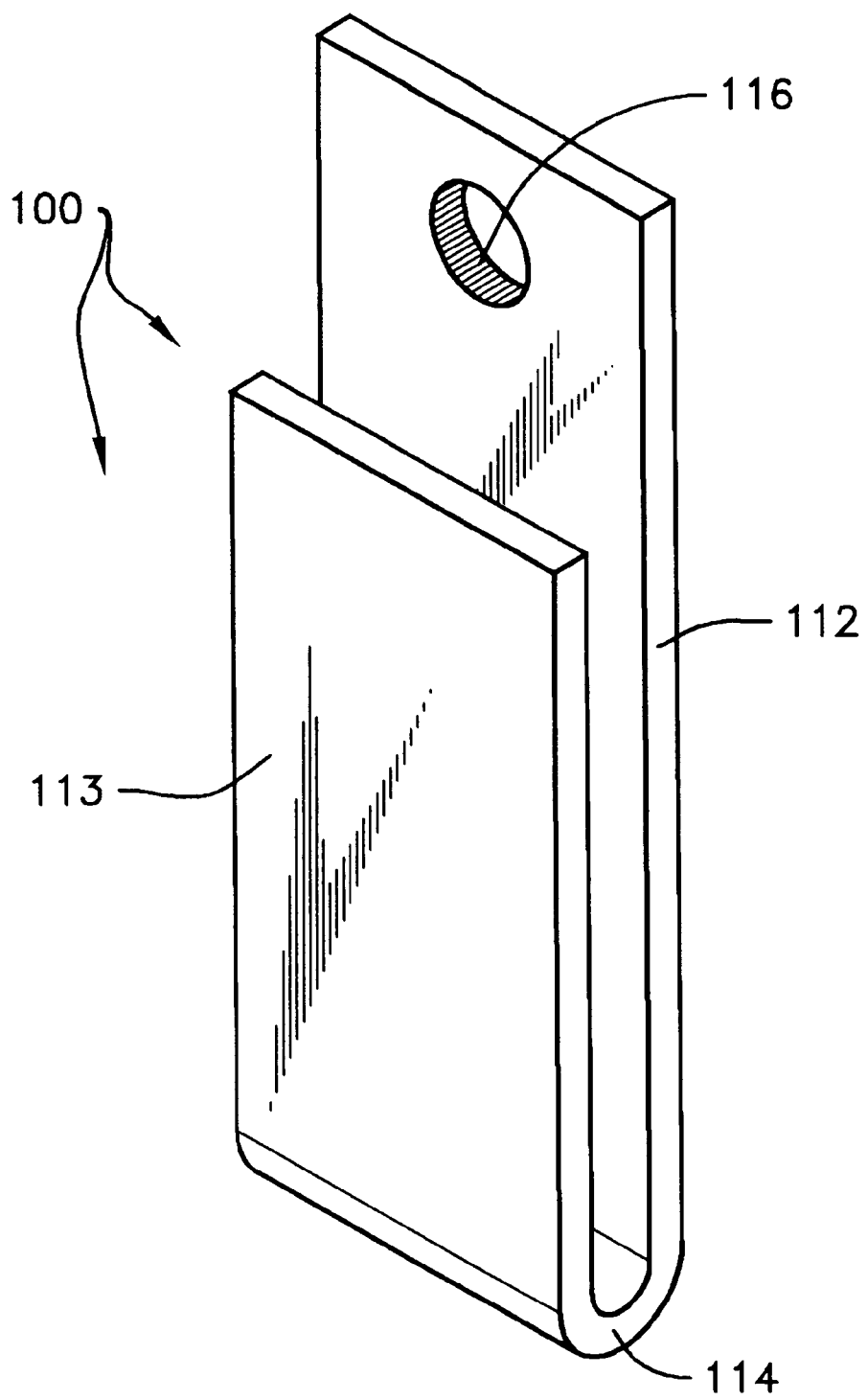
FIG. 14 is an enlarged, isometric view of the clasp of FIGS. 11–12.

Preferably, the flexible net 52 is in the form of a regular polygon, preferably a rectangle, that has a plurality of diametrically opposed corners 54–57. Outwardly extending draw straps 60–63 emanate from the corners 54–57 respectively (FIG. 1). Each strap 60–63 ends in outer, conventional buckles 70, 71, 72 and 73 respectively that enable the net 52 to be coupled together outside the vehicle. Alternatively, the buckles 70–73 can be connected to enable the net to be forcibly manipulated once installed upon the structure to be deflected or bent. The buckles 70–73 permit attachment of net to diverse apparatus. Referencing FIG. 31, the buckles at the end of the draw straps are externally exposed and accessible near the windshield area in front of the vehicle 51 (FIG. 31), for convenient grasping and manipulation.

Preferably the rescue system 50 comprises one or more draw hook assemblies 65 that can be attached to the net at numerous and various spaced-apart locations, depending upon the configuration of the folded net attained upon installation. The net comprises a plurality of interleaved, flexible lengths, preferably made of reinforced polyester, which are assembled in a mutually orthogonal woven pattern. The lengths may be stitched together at their respective corners and ends for extra strength. Preferably draw straps 60, and 63 are integral with a top horizontal length 66 of the net, and draw straps 61 and 62 are integral with a bottom horizontal length 67. 59 (FIG. 5) Numerous smaller horizontal lengths 68 are disposed in regular, spaced apart alignment in between and parallel with respect to lengths 66 and 67. Numerous spaced-apart, vertical lengths 69 are interlaced between horizontal lengths 68 in woven fashion. Lengths 69 extend perpendicularly between lengths 66 and 67 in regular, spaced apart alignment between and in parallel with end lengths 64. There are numerous square voids 59 (FIG. 5) formed between intersecting lengths. The voids are preferably dimensioned approximately the same as the width of the lengths, as evident from FIGS. 4 and 5.

Figure 35:
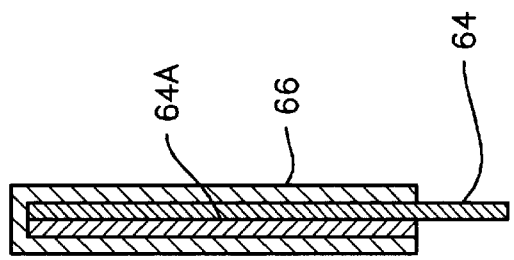
FIG. 35 is an enlarged sectional view taken generally along line 35—35 of FIG. 34; and, FIG. 36 is an enlarged, fragmentary isometric view of region 34 circled in FIG. 5.
Figure 36:
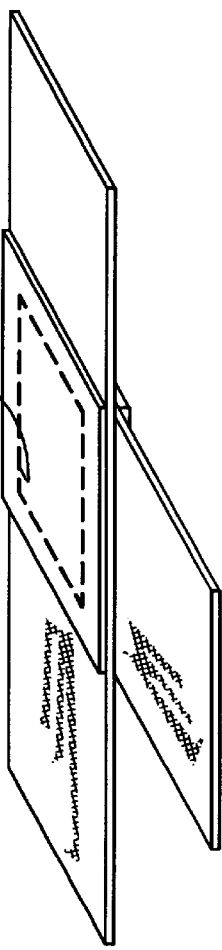
Figure 34:
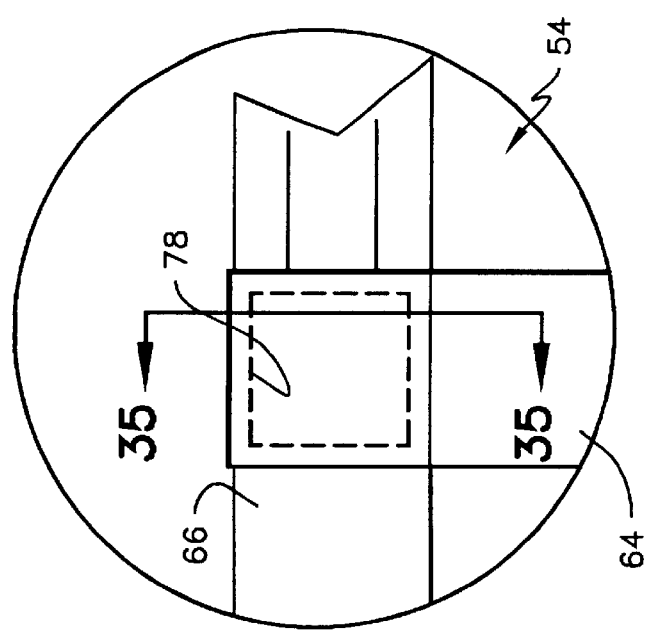
FIG. 34 is an enlarged, fragmentary plan view of region 34 circled in FIG. 5, showing the strengthened pad construction at the corners of the preferred nets.

All of the individual lengths of the net unite to form a flexible woven netting. They are preferably formed from high density, high strength reinforced polyester. At points where individual lengths cross, there are numerous reinforcing stitches 75 (FIG. 5) applied. At corners 54–57 extra stitching 78 (FIG. 34) in the form of a heavily over-stitched square is employed. Referring to FIGS. 34–36, reinforced end corners are seen. FIG. 35 reveals that the outer lengths 66 and 67 (and draw straps 60–63) are two-ply; they are folded over themselves lengthwise, to form an integral two-ply construction. At the corners, these are lapped over folded ends 64A (FIG. 35) of the end lengths 64 for extra strength. Noting FIG. 35 for example, the two plies of length 66 are doubled over, sandwiching similarly doubled over ends 64A of lengths 64. Rigorous extra-strength stitching 78 (FIGS. 34, 36) preserves this structural integrity. Virtually all of the exposed body porftions of all the lengths forming the new may be engaged by one or more draw hook assemblies 65, that mechanically link to the net so that it may be forcibly pulled by conventional, powered equipment in typical use by rescue personnel.

Referring now to FIGS. 6–10, the draw hook assembly 65 enables manipulation of the rescue net. It comprises a rigid clasp 100 adapted to grasp a portion of the net, a rigid draw hook 102, and one or more auxiliary hooks 103 adapted to be captivated within the cradle 104 of draw hook 102. Additionally, it is preferred that the draw hook's cradle 104 be "closed" or sealed by a transverse closure plate 106. The rigid elongated shank 108 integrally extends between a removable threaded lock 109, which captivates the top of shank 108 within clasp 100, and cradle 104, which penetrates plate 106, and which includes another threadably removable lock 110.

As best seen in FIGS. 11–14, the clasp 100 comprises a rigid, steel member that is foldably bent into the U-shaped profile of FIG. 12. The longer wall 112 is parallel with and spaced apart from integral shorter wall 113, both of which are joined by union 114. An orifice 116 (FIG. 11) defined in clasp 100 receives the end of the draw hook shank 108 (FIG. 9). Importantly, the rigid, parallel and spaced apart clasp walls 112, 113 define a slot 118. A miscellaneous portion 120 (FIGS. 9, 10) of the primary net 52 is slidably captivated within this slot 118 when the clasp 100 is installed at a desired operative position. Because the flat net lengths are neatly and flushly sandwiched within slot 118 between opposed, parallel walls 112, 113 of the clasp 100, tearing or other forms of undesirable net damage is avoided, notwithstanding the pull strengths applied during rescue, which can exceed several thousand pounds.

Figures 15, 16:
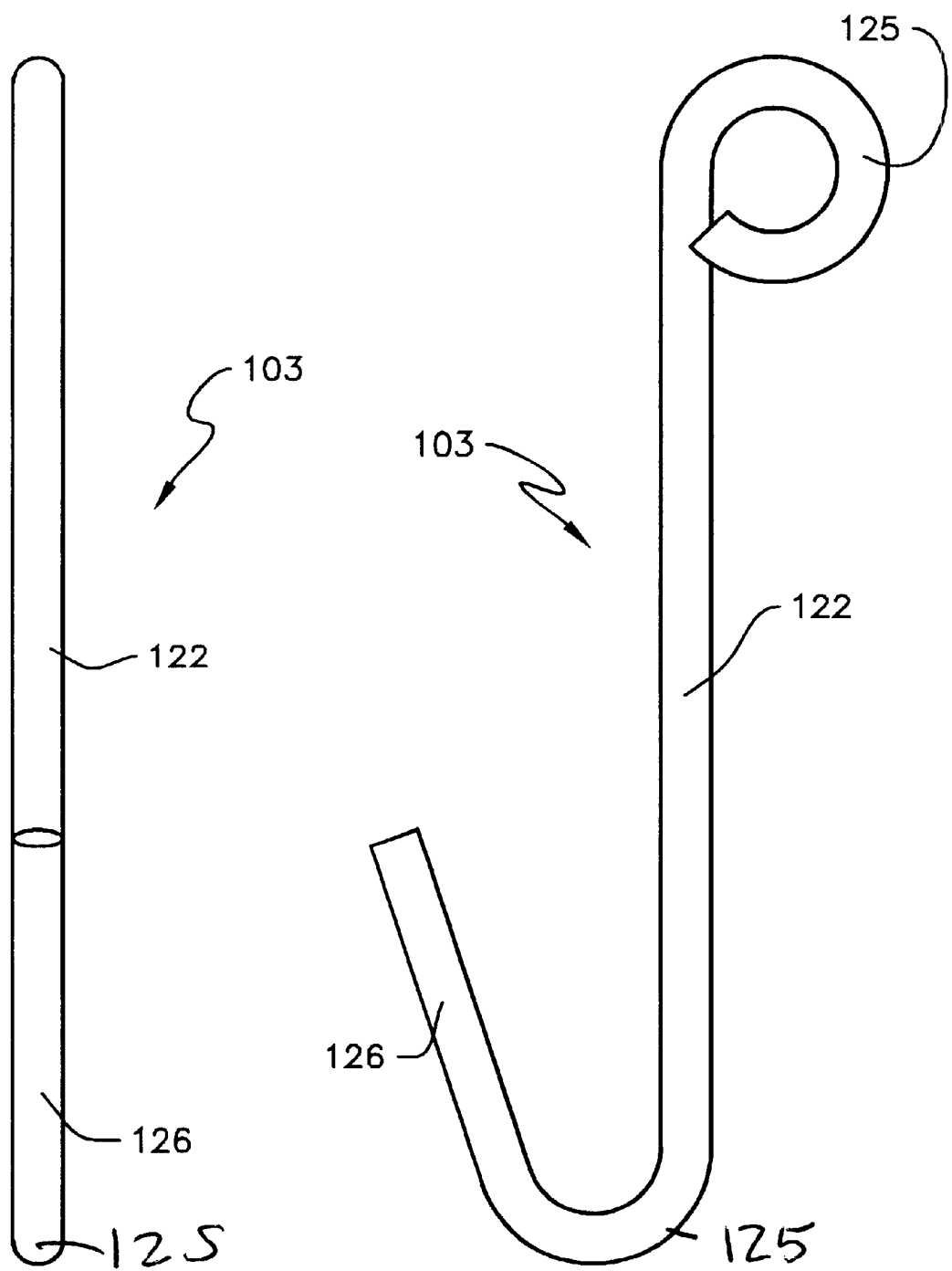
FIG. 15 is an enlarged, elevational view of the auxiliary hook.
FIG. 16 is an side elevational view of the auxiliary hook, taken from a position to the left of FIG. 15.
Figure 17:
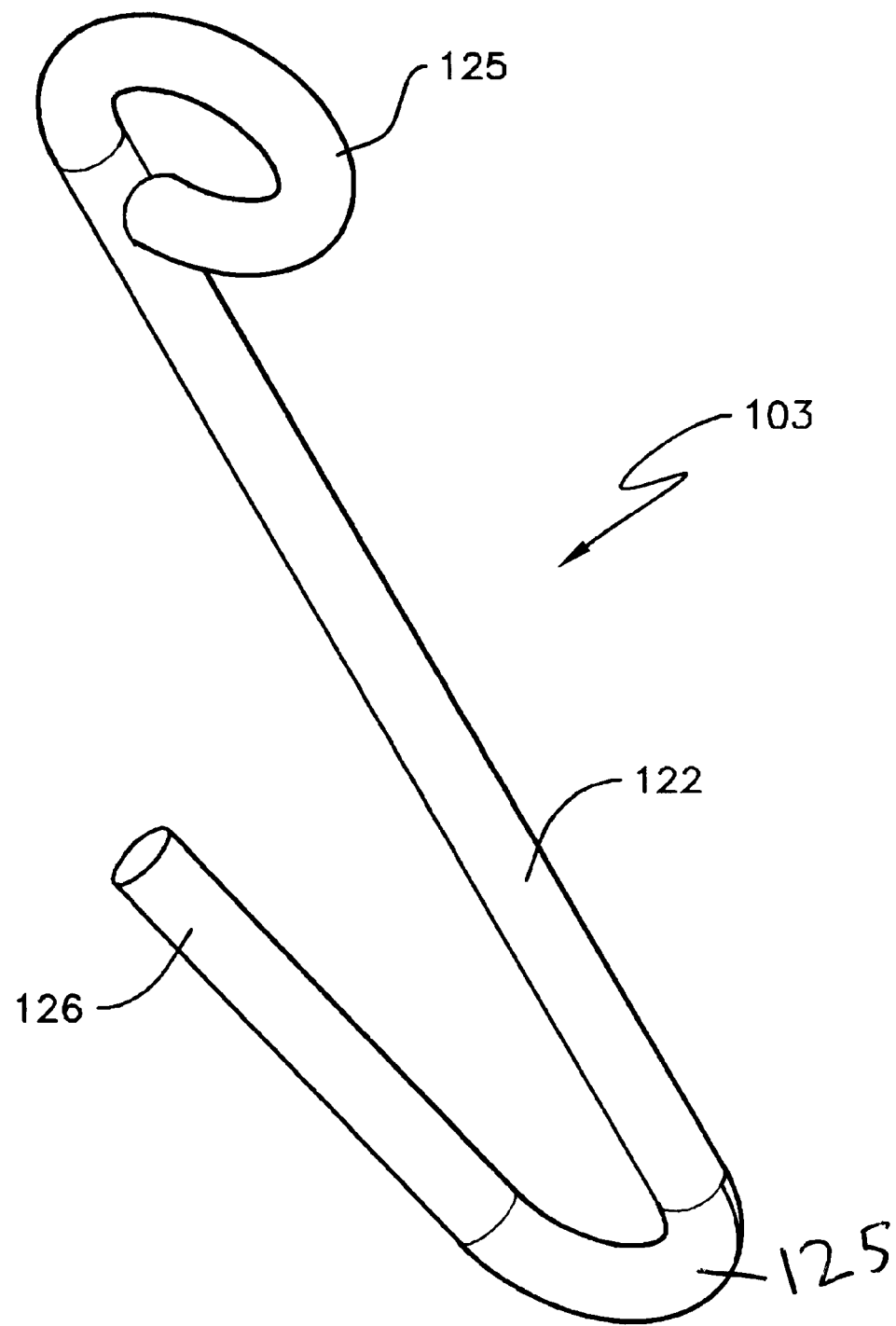
FIG. 17 is an enlarged, isometric view of the auxiliary hook of FIGS. 15 and 16.
Figure 25:
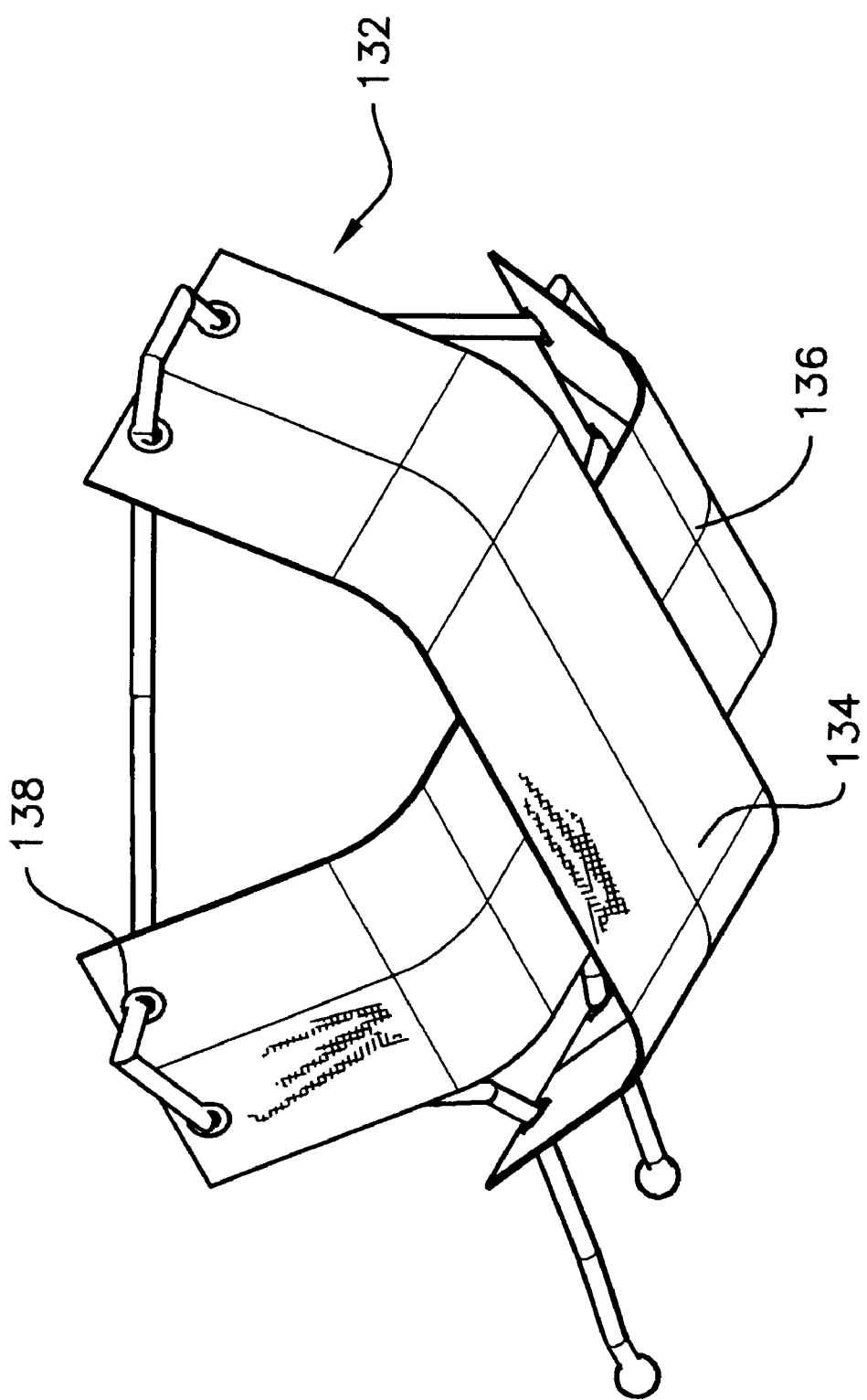
FIG. 25 is a top view of the auxiliary steering wheel net.
Figure 26:
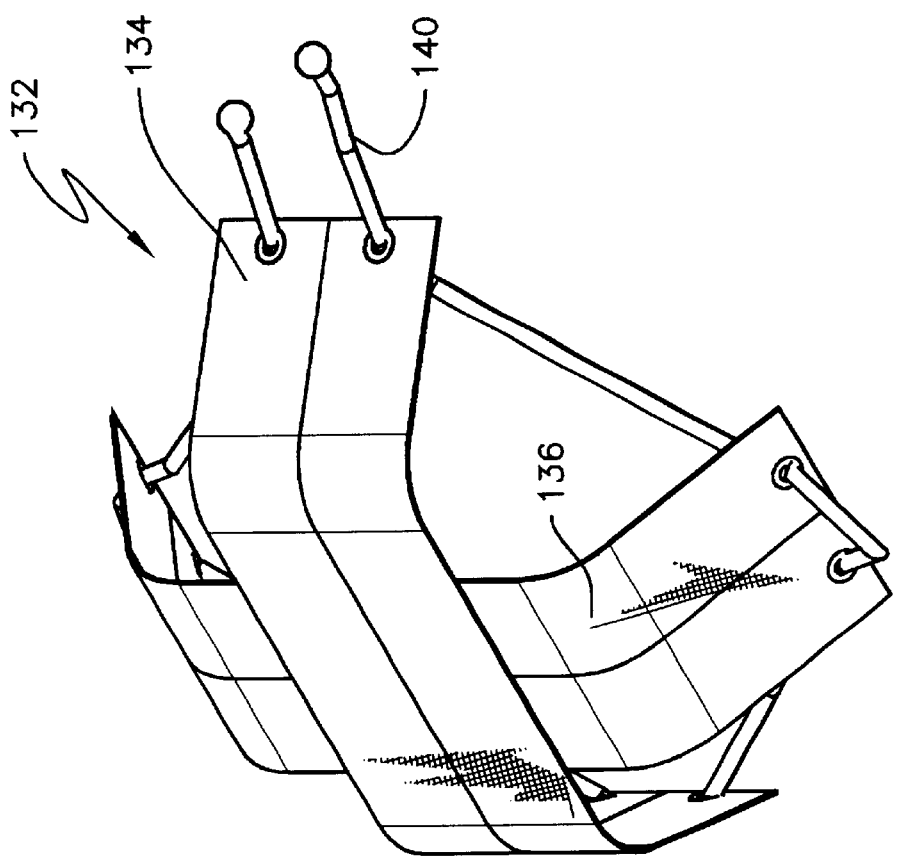
FIG. 26 is a frontal isometric view of the auxiliary steering wheel net.
Figure 27:
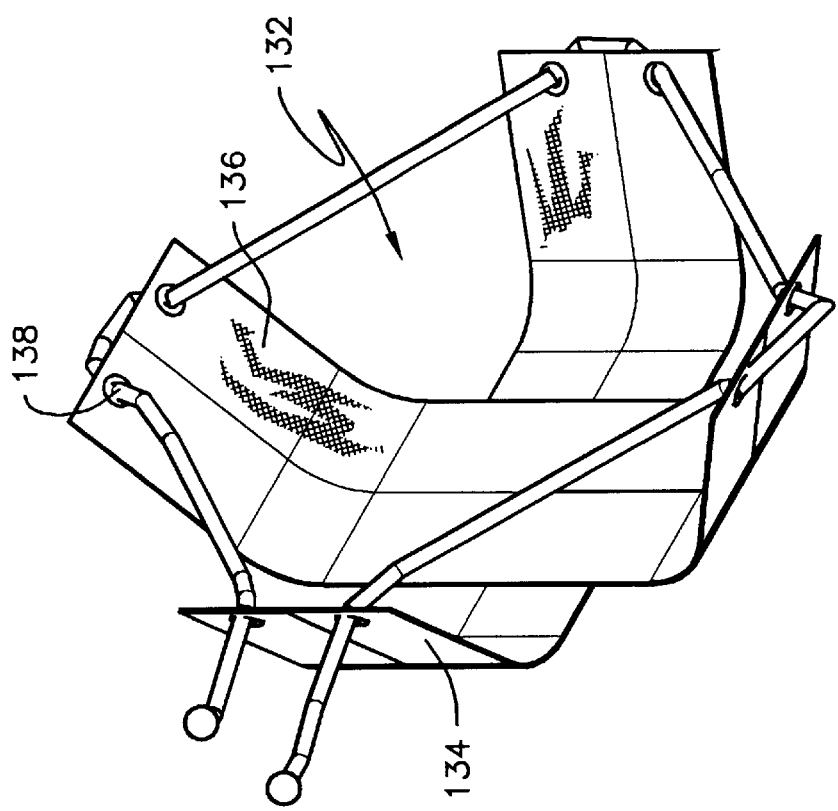
FIG. 27 is a bottom isometric view of the auxiliary steering wheel net.

The auxiliary hook 103 is detailed in FIGS. 15–17. One or more of these hooks can be secured within the cradle 104 discussed earlier. Each auxiliary hook 103 comprises a shank 122 which integrally extends between a terminal loop 125 and a lower jaw 126. Each loop 125 is captivated upon and penetrated by draw hook cradle 104 discussed earlier, as seen, for example, in FIGS. 6–8. The auxiliary hook jaws 126 may engage diverse elements or items such as structural rod 128 (FIGS. 9, 10). Such rods may also be inserted through the net draw strap end loops discussed earlier to aid in manipulation.

When captivated and supported by cradle 104, one or more hooks 103 are secured by optional closure plate 106, seen best in FIGS. 19–21. This rigid, generally rectangular plate 106 has a pair of spaced apart orifices 130 (FIGS. 18–20) which receive and are penetrated by cradle 104 as discussed earlier. Once installed, the closure plate 106 prevents the auxiliary hooks 103 from escaping cradle 104.

Figure 29:
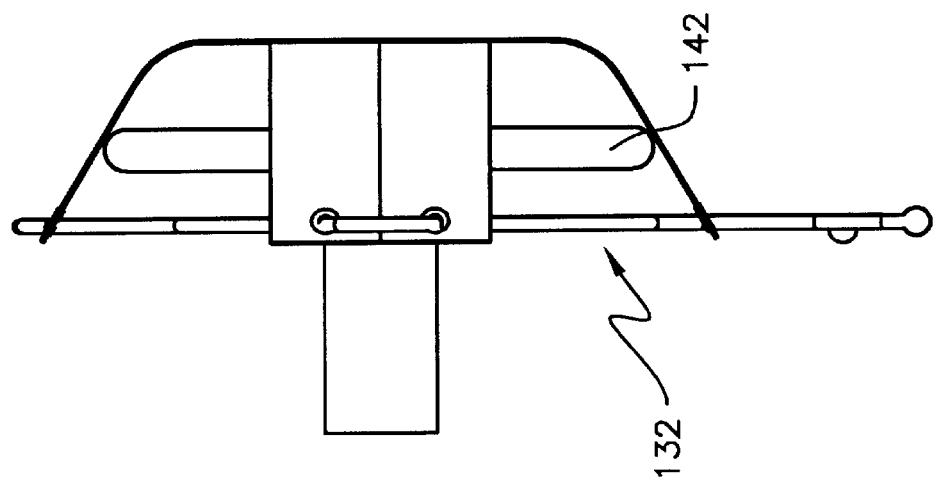
FIG. 29 is a diagrammatic elevational view derived from FIG. 28, with portions thereof broken away or shown in section for clarity.
Figure 28:
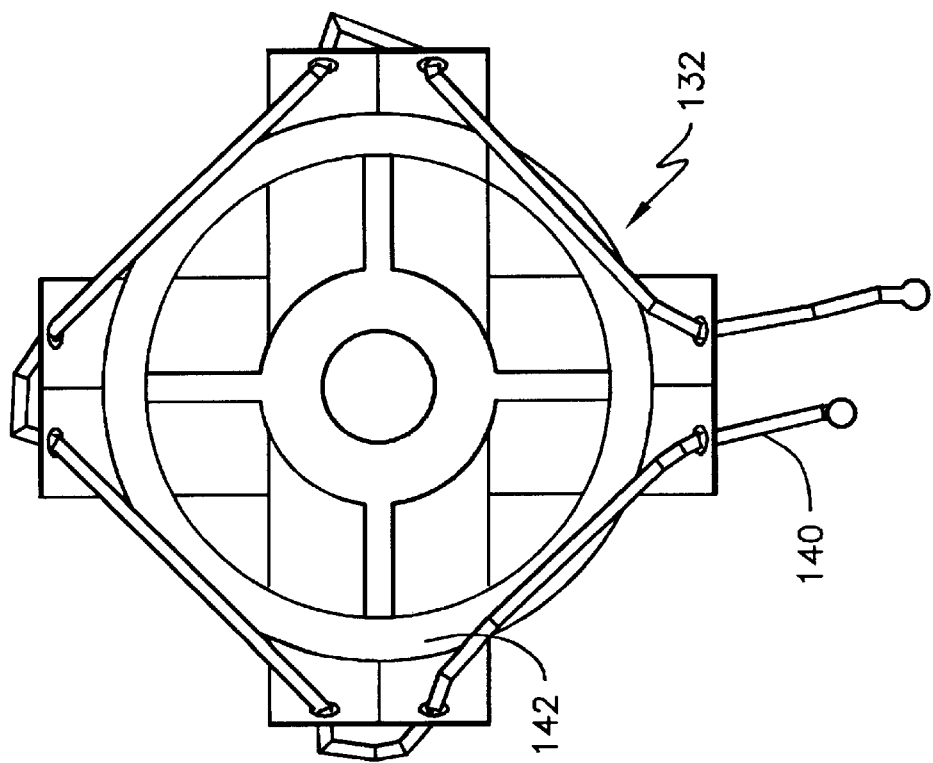
FIG. 28 is a combined diagrammatic and fragmentary isometric view of the secondary steering wheel net, taken from a position below a steering wheel and looking upwardly, showing the auxiliary net placed upon a conventional steering wheel.

The system 50 preferably comprises a reduced size, secondary steering wheel net 132 seen in FIGS. 24–30. The main net 54 can manipulate the steering column, but it is preferred to use this smaller, secondary net 132 to directly and separately cover the steering column. This in effect covers and blocks the air bag mounted within the steering column, safely guarding and constraining the air bag. Auxiliary steering wheel net 132 is cross-shaped in configuration. A first rectangular, two ply folded panel 134 is joined to a similar intersecting panel 136. Each panel terminates in reinforced metallic eyelets 138 press-fitted into the fabric of the panels 134 and 136 at their outer extremities. A draw cord 140 extends around the auxiliary net, being routed through the various eyelets 108. As seen in FIGS. 28–30, the net can circumscribe and captivate the steering wheel 142 of the vehicle isolating the air bag disposed above the steering column 144. As the cord 140 is tightened, the steering column air bag will be isolated and protectively shrouded. The cord ends are conventionally locked together to semi-permanently secure the auxiliary net 132 in proper operative position.

Figure 32:
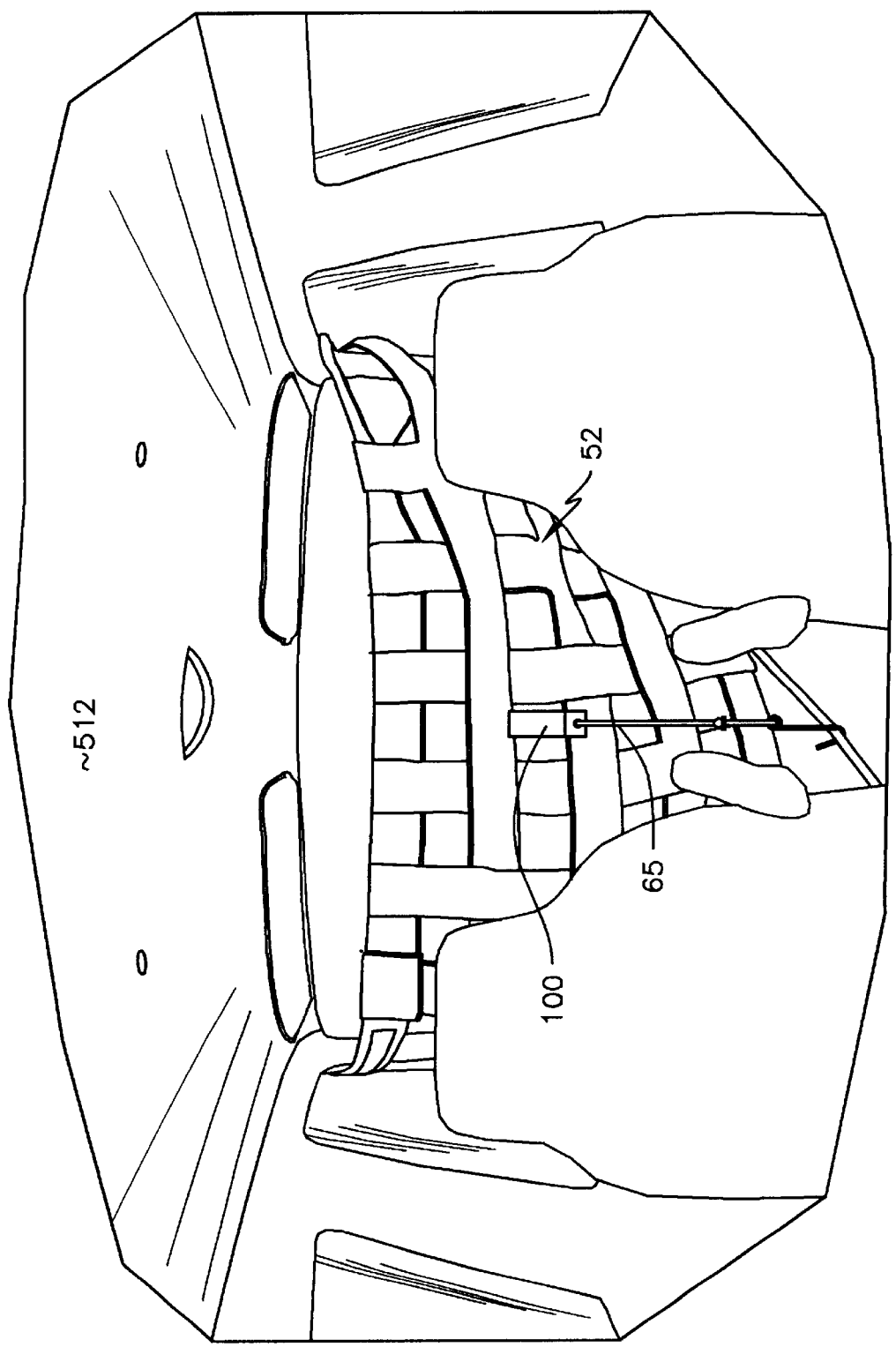
FIG. 32 is a diagrammatic environmental view taken from a position within a crashed vehicle and looking towards the dashboard and showing the preferred net assembly installed, with portions thereof broken away or shown in section for clarity.
Figure 33:
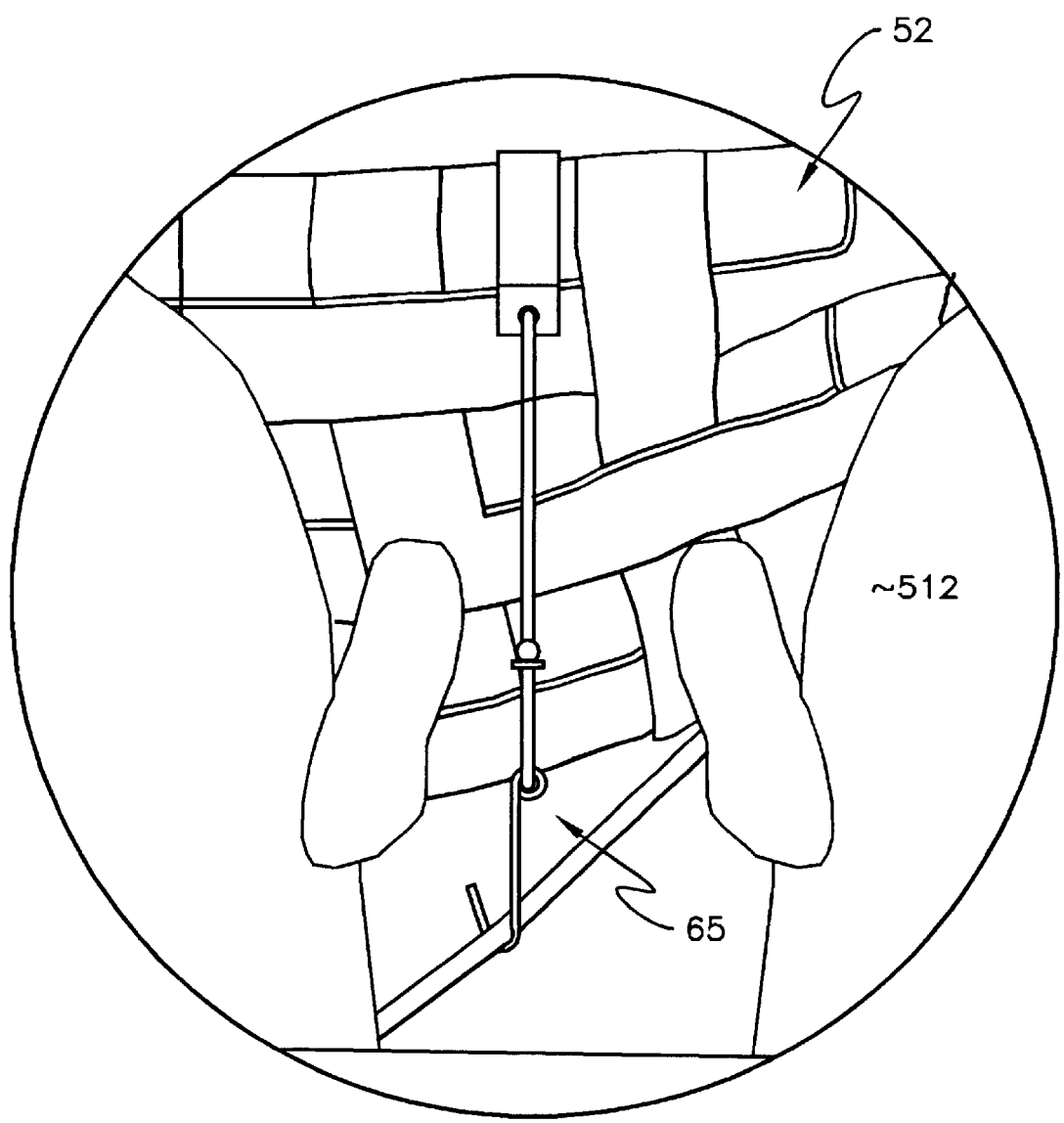
FIG. 33 is an enlarged, diagrammatic environmental view taken from a position within a crashed vehicle, similar to FIG. 32.

In operation the smaller auxiliary net is first installed as aforesaid, if the steering wheel 142 and steering column 144 are accessible. Usually it is critical to deflect the steering column and deflect it upwardly to free pinned or trapped occupants. After the smaller net is installed, the larger net system 50 may be installed as seen in FIGS. 32 and 33. The interior of the vehicle 51 is seen in these views. The primary net 52 is carefully placed about the dashboard t the extent possible, with its straps 60–63 clearing the interior and extending outside of the vehicle. One or more draw hook assemblies 65 can be fitted as necessary to grasp internal parts, as in FIG. 32. In this regard it is to be emphasized that the clasps 100 should be carefully placed at multiple strategic intervals both within and without the crashed vehicle to maximize maneuverability.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rescue system for freeing trapped occupants from crashed vehicles, said system comprising:
    a flexible net adapted to be disposed at least partially within a crashed vehicle in the immediate proximity of or adjacent to vehicular air bags to protect trapped occupants as the vehicle structure is bent or deformed to free said occupants for rescue, said net comprising:
    a plurality of orthogonally weaved, intersecting lengths of a first predetermined width, numerous spaced apart voids disposed between said lengths, the voids having a second predetermined width approximately equal to said first predetermined width;
    a plurality of outwardly extending draw straps adapted to be externally connected together for attachment to a power lifting or pulling source, said draw straps terminating in external buckles that may be coupled together outside said crashed vehicle(s); and,
    a plurality of draw hook assemblies adapted to be attached to the net at numerous and various spaced-apart locations, each draw hook assembly comprising:
        a rigid clasp adapted to non-destructively grasp a portion of a length of the net, each clasp comprising a pair of rigid, substantially planar and parallel walls forming an elongated slot therebetween which is adapted to slidably receive at least a portion of the net, the clasp walls having a length and width approximately equal to said first and second predetermined widths to efficiently and non-destructively distribute forces encountered during use of the system with a portion of the net captivated within said slot; and,
        at least one rigid draw hook coupled to each clasp for interconnection with selected vehicle structure to hold down and anchor the net.

2. The rescue system as defined in claim 1 further comprising at least one auxiliary hook adapted to be captivated by at least one draw hook for connection to the crashed vehicle, and wherein the draw hook terminates in a cradle that captivates the auxiliary hooks, and the draw hook comprises a closure plate that prevents escape of the auxiliary hooks.

3. The rescue system as defined in claim 2 further comprising a reduced size, secondary net for separately and independently covering a steering wheel of said vehicle(s) to block an air bag within said steering wheel, the secondary net comprising:
    a plurality of orthogonally weaved, intersecting lengths of a third predetermined width, numerous spaced apart voids disposed between said lengths, the voids having a fourth predetermined width approximately equal to said first predetermined width, whereby said clasps may non-destructively grasp and captivate a portion of a length of the secondary net; and,
    a draw string enabling the secondary net to be attached to said steering wheel.

4. A rescue net for freeing trapped occupants from a crashed vehicle, said net comprising:
    a flexible net for deployment within said crashed vehicle in contact with damaged or deformed vehicular structure to be bent or deflected to free said occupants, said net comprising:
    a plurality of orthogonally weaved, intersecting lengths of a first predetermined width, numerous spaced apart voids disposed between said lengths, the voids having a second predetermined width approximately equal to said first predetermined width;
    a plurality of outwardly extending draw straps adapted to be externally connected together for attachment to a power lifting or pulling source, said draw straps terminating in external buckles that may be coupled together outside said crashed vehicle(s); and, draw hooks for attachment to the net at numerous and various spaced-apart locations, said draw hooks comprising:
- a rigid clasp adapted to non-destructively grasp a portion of a length of the net, each clasp comprising a pair of rigid, substantially planar and parallel walls forming an elongated slot therebetween which is adapted to slidably receive at least a portion of the net, the clasp walls having a length and width approximately equal to said first and second predetermined widths to efficiently and non-destructively distribute forces encountered during use of the system with a portion of the net captivated within said slot; and,
- at least one rigid draw hook coupled to each clasp for interconnection with selected vehicle structure to hold down and anchor the net.

5. The rescue system as defined in claim 4 further comprising auxiliary hooks adapted to be captivated by said draw hooks for interconnection with the crashed vehicle, and wherein the draw hooks terminate in a cradle that captivates the auxiliary hooks and the draw hooks comprise closure plates for preventing escape of the auxiliary hooks.

6. The rescue system as defined in claim 5 further comprising a reduced size, secondary net for separately and independently covering a steering wheel of said vehicle(s) to block an air bag within said steering wheel, the secondary net comprising:
- a plurality of orthogonally weaved, intersecting lengths of a third predetermined width, numerous spaced apart voids disposed between said lengths, the voids having a fourth predetermined width approximately equal to said first predetermined width, whereby said rigid clasp may non-destructively grasp and captivate a portion of a length of the secondary net means; and,
- a draw string for securing the secondary net means to said steering wheel.

* * * * *